US012791675B2

(12) United States Patent
Zhao et al.

(10) Patent No.: US 12,791,675 B2
(45) Date of Patent: Nov. 10, 2026

(54) LENS FOR ToF

(71) Applicant: SHENZHEN METALENX TECHNOLOGY CO.,LTD, Shenzhen (CN)

(72) Inventors: Xiaobo Zhao, Shenzhen (CN); Heshan Lin, Shenzhen (CN); Chenglong Hao, Shenzhen (CN); Fengze Tan, Shenzhen (CN); Jian Zhu, Shenzhen (CN)

(73) Assignee: SHENZHEN METALENX TECHNOLOGY CO., LTD., Shenzhen (CN)

( * ) Notice: Subject to any disclaimer, the term of this patent is extended or adjusted under 35 U.S.C. 154(b) by 368 days.

(21) Appl. No.: 18/752,749

(22) Filed: Jun. 24, 2024

(65) Prior Publication Data

US 2025/0044420 A1 Feb. 6, 2025

(30) Foreign Application Priority Data

Jul. 28, 2023 (CN) ........................ 202322026109.X

(51) Int. Cl.
*G01S 7/481* (2006.01)
*G02B 13/00* (2006.01)

(52) U.S. Cl.
CPC ........ *G01S 7/4816* (2013.01); *G02B 13/0055* (2013.01); *G02B 13/008* (2013.01)

(58) Field of Classification Search
CPC .. G01S 7/4816; G02B 13/0055; G02B 13/008
USPC .......................................................... 359/642
See application file for complete search history.

(56) References Cited

U.S. PATENT DOCUMENTS

2023/0384481 A1* 11/2023 Lai ......................... G02B 1/002

FOREIGN PATENT DOCUMENTS

CN 112099193 7/2021
CN 220438637 2/2024

* cited by examiner

*Primary Examiner* — William Choi
(74) *Attorney, Agent, or Firm* — JCIPRNET

(57) ABSTRACT

A lens for ToF is provided, the lens includes: an optical system and a lens barrel; and the optical system is confined within the lens barrel. The optical system includes: an aperture slot, an optical filter, and a metalens. The aperture slot, the optical filter and the metalens are disposed sequentially from the object side to the image side, and the total track length of the optical system is less than or equal to 3.1 mm.

20 Claims, 18 Drawing Sheets

LENS FOR ToF

CROSS-REFERENCE TO RELATED APPLICATIONS

This application claims the benefit of priority from Chinese Patent Application No. 202322026109.X, filed on Jul. 28, 2023. The content of the aforementioned application, including any intervening amendments thereto, is incorporated herein by reference in its entirety.

TECHNICAL FIELD

The present disclosure relates to the field of an optical system, in particular to a lens for ToF.

BACKGROUND

The working principle of ToF (Time of Flight) is that the sensor emits the radiation, such as infrared light or laser, and the emitted radiation will be reflected to the sensor. Based on the flight time of the radiation from emission to return to the sensor and the speed of light, the precise distance from the sensor to the object can be calculated.

Compared with deep information acquisition technologies such as structural light and binocular vision, ToF also occupies a position in the market with its high precision, low cost and small volume. The high accuracy of the ToF requires its receiving lenses to have relatively stable characteristics, and have a stable performance when the temperature changes or the distance from the objection to the lens changes. However, the receiving lenses in prior art use a combination of glass lenses and plastic lenses to compress the defocus caused by the change of the temperature. But this kind of combination has a limitation of miniaturization.

Therefore, there is in an urgent need of a small volume lens for ToF with stable performance.

SUMMARY

In view of the technical problems that the receiving lens of the ToF can't reduce the volume as keep the stable performance. A lens for ToF is provided according to embodiments of the present disclosure, so as to overcome the problems in the related art.

A lens for ToF, wherein the lens includes: an optical system and a lens barrel; the optical system is confined within the lens barrel;

where the optical system includes: an aperture slot, an optical filter, and a metalens; the aperture slot, the optical filter and the metalens are disposed sequentially from the object side to the image side;

the total track length of the optical system is less than or equal to 3.1 mm.

Optionally, the optical system satisfies:

$$2.00 \text{ mm} \le H_1 + H_2 + BFL \le 4.30 \text{ mm};$$

Where the $H_1$ is the distance between the aperture slot and the optical filter; $H_2$ is the distance between the metalens and the optical filter; BFL is the back focal length of the optical system.

Optionally, the optical system satisfies:

$$1.98 \text{ mm} \le H_1 + H_2 + BFL \le 2.31 \text{ mm};$$

where the $H_1$ is the distance between the aperture slot and the optical filter; $H_2$ is the distance between the metalens and the optical filter; BFL is the back focal length of the optical system.

Optionally, the metalens satisfies:

$$-\frac{\pi}{a_1 \lambda D} \le 1.5;$$

$$\varphi = -\frac{a_1 \lambda}{\pi};$$

where $a_1$ is the phase coefficient of the metalens; λ is the wavelength of the incident light; D is the diameter of the entrance pupil of the optical system; φ is the phase of the metalens.

Optionally, the metalens satisfies:

$$-\frac{\pi}{a_1 \lambda D} \le 1.1$$

where $a_1$ is the phase coefficient of the metalens; λ is the wavelength of the incident light; D is the diameter of the entrance pupil of the optical system.

The lens barrel satisfies:

$$a_H * L \le 124.1;$$

where $a_H$ is the thermal expansion coefficient of the material of the lens barrel; L is the length of the lens barrel.

Optionally, the lens barrel satisfies:

$$a_H * L \le 70.8;$$

where $a_H$ is the thermal expansion coefficient of the material of the barrel; Lis the length of the lens barrel.

Optionally, the lens barrel includes: a first lens barrel, a second lens barrel and a third lens barrel;

where the first lens barrel is in detachable socketing to the inside of the second lens barrel; the second lens barrel is in detachable socketing to the inside of the third lens barrel.

Optionally, the inner wall of the first lens barrel has a first hole, and the first hole is tapered;

the end of the larger inner diameter of the first hole is towards the object side, and the end of the smaller inner diameter of the first hole is towards the image side.

Optionally, the second lens barrel is open, and the other end has a radial-shrinkage stair;

the center of the radial-shrinkage stair has a second hole.

Optionally, the second hole is tapered;

the smaller inner diameter of the second hole is close to the open end of the second lens barrel, and the larger inner diameter of the second hole is away from the open end of the second lens barrel.

Optionally, one end of the third lens barrel is open, and the other end has a baseboard, and the center of the baseboard has a third hole.

Optionally, the metalens is covered on the first hole, the part of the substrate with nanostructures covers the first hole, and the extended part of the substrate without nanostructures is pressed on the baseboard.

Optionally, the optical filter is covered on the smaller inner diameter of the second hole, and the first lens barrel is socketing to the second lens barrel, so as to form a fixation by pressing the smaller inner diameter end of the first hole on the optical filter.

Optionally, the aperture slot is set on the one end of the larger inner diameter of the first hole.

Optionally, the optical filter and the metalens can be fixed by gluing.

Optionally, the first lens barrel and the second lens barrel are connected by screw thread;

and the second lens barrel and the third lens barrel are connected by screw thread.

Optionally, a flange is setting on the outer wall of the first lens barrel, and the outer wall of the flange has an outer screw thread;

the outer screw thread of the flange is used to connect to the inner screw thread of the second lens barrel.

Optionally, the entrance pupil of the optical system is greater than or equal to 1.2 mm and is less than or equal to 1.4 mm; and the effective focal length of the optical system is greater to or equal to 1.3 mm and less than or equal to 1.4 mm.

Optionally, the entrance pupil of the optical system is greater than or equal to 1.2 mm and is less than or equal to 1.4 mm; or the effective focal length of the optical system is greater to or equal to 1.3 mm and less than or equal to 1.4 mm.

In conclusion, the technical solution provided by this disclosure achieves at least the following technical effects:

The lens for ToF provided by this disclosure uses only one metalens, which achieves miniaturization and has a stable output at different ambient temperatures.

BRIEF DESCRIPTION OF THE DRAWINGS

The present disclosure may be better understood by reference to the description given below in combination with the drawings, where the same or similar drawing markings are used in all the drawings to represent the same or similar components. The drawings are included in the specification along with the following detailed description and form part of the specification, and to further illustrate the preferred embodiments of the disclosure and explain the principles and advantages of the disclosure.

DETAILED DESCRIPTION OF THE EMBODIMENTS

Figure 1:
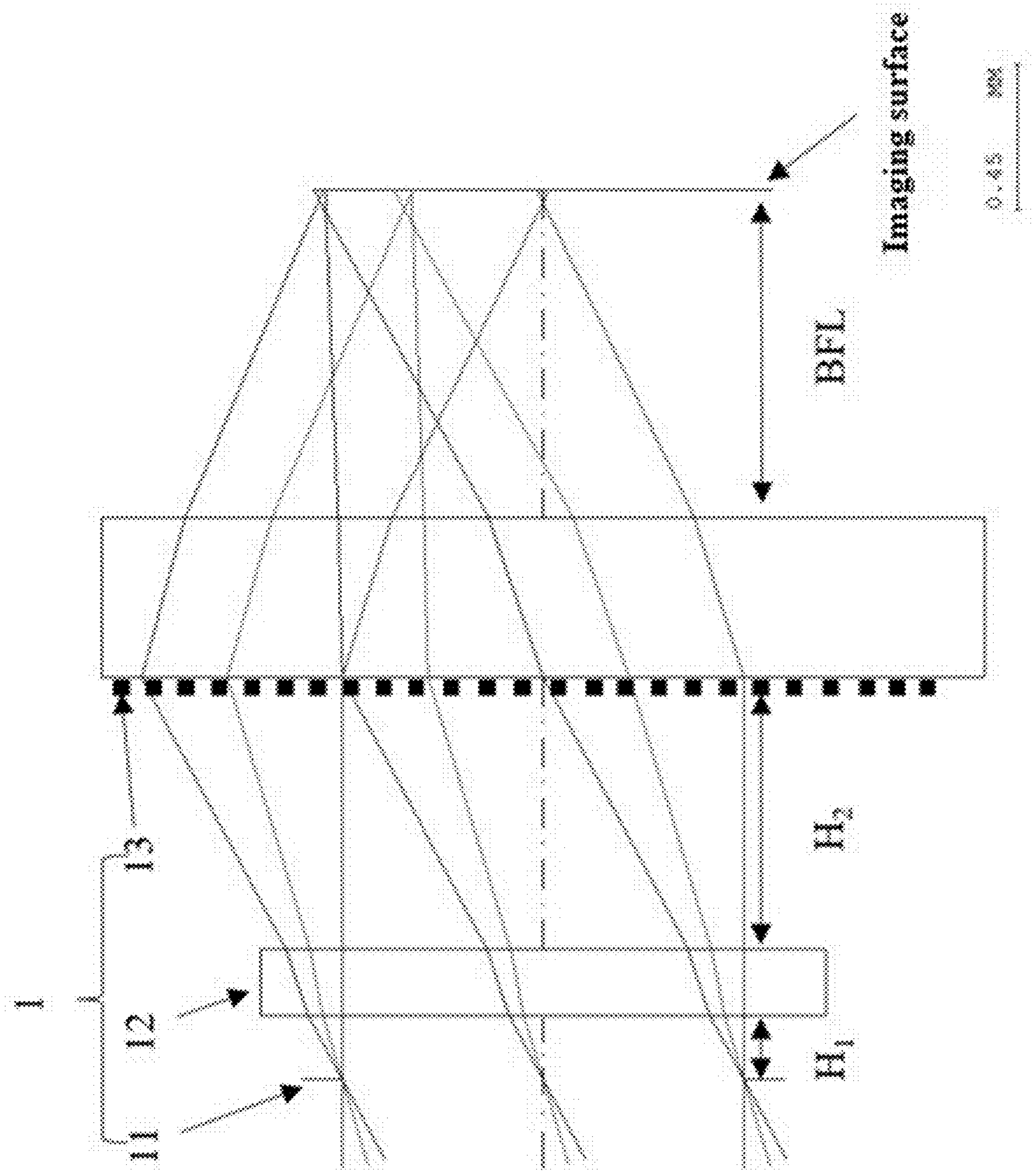
FIG. 1 shows an optional structural diagram of a lens for ToF provided by the embodiment of the present disclosure.

The disclosure is more comprehensively described below with reference to the drawings, and the embodiments are shown in the drawings. However, the present disclosure may be implemented in many different ways, and should not be construed as limited to the embodiment described herein. Instead, these embodiments are provided that the disclosure will be exhaustive and complete, and will fully describe the scope of the disclosure to those skilled in the art. The same attached drawing marks indicate the same components in the present disclosure. Furthermore, in the drawings, the thickness, ratio and size of the components are enlarged to illustrate clearly.

The term used herein is used only for the purpose of describing the specific embodiment and is not intended to be a limitation. The "a", "an", "this" and "one" do not represent a limit on the quantity in the disclosure. It is intended to include both singular and plural. For example, "one part" has the same meaning as "at least one part" unless the context clearly indicates otherwise. "At least one" should not be interpreted as limiting to the quantity "one". "Or" means "and/or". The term "and/or" includes any and all combinations of one or more of the associated listed items.

Unless the disclosure is limited, all terms used herein, including technical and scientific terms, have the same meaning as commonly understood by those skilled in the field. The terms defined in a jointly used dictionary shall be construed to have the same meaning as those in the relevant technical context and are not interpreted in an idealized or overly formal meaning unless expressly defined in the specification.

The meaning of "include" or "contain" specifies the nature, quantity, step, operation, parts, parts, or combinations thereof, but does not exclude other nature, quantity, step, operation, parts, or a combination of them.

This disclosure describes the implementation with reference to the section diagram as an idealized embodiment. Thus, this disclosure can be relative to illustrated shape changes as a result, for example, the manufacturing technique and/or tolerance. For example, the area shown as flat may typically have coarse and/or non-linear characteristics. Also, the sharp angles shown may be rounded. Thus, the areas shown in the drawings are schematic in nature and their shapes are not intended to show the precise shape of the area and are not intended to limit the scope of the claims.

The below embodiments will be described the exemplary method according to the drawings. A preferred embodiment of this disclosure is given in the accompanying drawings. However, the present disclosure may be implemented in many different ways and is not limited to the embodiments described herein. Conversely, the purpose of providing these embodiments is to provide a more thorough and comprehensive of the disclosure content of the present disclosure.

It should be noted that the terms used in the disclosure are only for the purpose of describing specific embodiments and are not limited. Unless the context is otherwise explicitly stated, the singular forms "one" and "the" used in the disclosure can also represent the plural form. The terms "include", "compose", "contain", and "have" are inclusive and thus indicate the presence of the stated characteristics, steps, operations, components, but do not preclude the existence or addition of one or more other features, steps, operations, components, and/or combinations thereof. The method steps, processes, and operations described in the text are not interpreted as requiring that they must be performed in the particular order described or explained, unless the order of execution is clearly indicated. It should also be understood that additional or alternative steps may be used.

Although multiple elements, components, regions, layers, and/or segments may be described using as the terms of "first", "second", and "third", etc. But these elements, parts, regions, layers, and/or segments should not be restricted by these terms. These terms can be used only to distinguish one element, one part, one region, one layer, and/or one segment from another element, part, region, layer, and/or segment. Terms such as "first", "second", and other numerical terms are used in the disclosure that does not imply the order or sequence, unless the context clearly indicates it. Accordingly, the first element, component, region layer, or segment discussed below may be referred to as a second element component, region, layer, or segment without departing from the embodiments.

In order to describe more clearly, the spatial relative terms can be used in the relation shown in one article, such as "internal", "external", "inside", "outside", "outside", "below", "above", "top". This spatial relative term means to include different orientations of the device in use or operation other than the orientation depicted in the drawings. For example, if the device in the drawing is flipped, the element may be described as "below the any other elements", or "under the any other elements", then the any other elements will be "above other elements" or "above other elements." Therefore, the example term "below" or may "under" may include the orientation both above and below. The device may be additionally oriented, such as rotating 90° or in other directions, and the spatial relative relationship descriptors is used to interpret accordingly.

Embodiments according to the present disclosure will be described with reference to the accompanying drawings.

Figure 2:
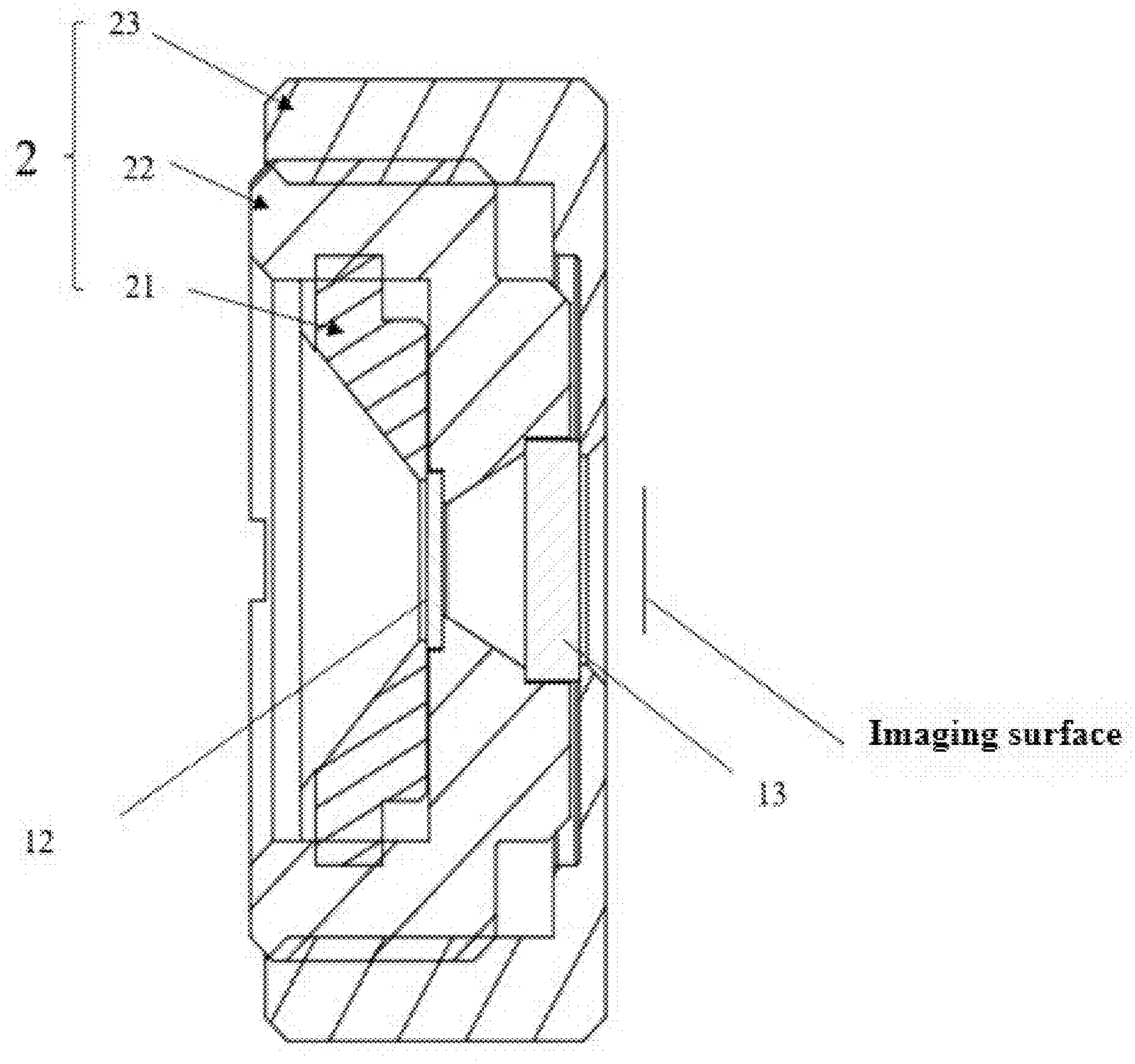
FIG. 2 shows an optional structural diagram of an optical system provided by the embodiment of the present disclosure.

A lens for ToF is provided by the embodiment of the present disclosure, as shown in FIG. 1 and FIG. 2, the lens includes an optical system 1 and lens barrel 2. The optical system is confined within the lens barrel, where the optical system comprises: an aperture slot, an optical filter, and a metalens; the aperture slot, the optical filter and the metalens are disposed sequentially from the object side to the image side, and the total track length of the optical system is less than or equal to 3.1 mm.

In some optional embodiments, the optical system satisfies:

$$2.00\text{ mm} \le H_1 + H_2 + BFL \le 4.30\text{ mm}; \tag{1}$$

Where the $H_1$ is the distance between the aperture slot and the optical filter; $H_2$ is the distance between the metalens and the optical filter; BFL is the back focal length of the optical system.

Since the thicknesses of the filter 12 and the metalens 13 are constant values, the parameters influencing the TTL of the optical system are only $H_1$, $H_2$ and BFL. The upper limitation in formula (1) constrains the TTL of the optical system, which is conducive to the miniaturization and lightness of the optical system. And the lower limitation in this formula (1) ensures that there is enough space among the elements of the optical system 1 for the configuration to ensure the stable installation of the optical system 1. And the lower limitation in the formula (1) can also make sure that the optical system 1 has enough back focal length to match in the focal length of the system, which is conducive to the quality of imaging.

Optionally, the optical system satisfies:

$$1.98\text{ mm} \le H_1 + H_2 + BFL \le 2.31\text{ mm}; \tag{2}$$

where the $H_1$ is the distance between the aperture slot and the optical filter; $H_2$ is the distance between the metalens and the optical filter; BFL is the back focal length of the optical system.

According to the embodiment of the present disclosure, the metalens 13 of the optical system 1 satisfies:

$$-\frac{\pi}{a_1\lambda D} \le 1.5; \tag{3}$$

$$\varphi = -\frac{a_1\lambda}{\pi}; \tag{4}$$

where $a_1$ is the phase coefficient of the metalens; λ is the wavelength of the incident light; D is the diameter of the entrance pupil of the optical system; φ is the phase of the metalens.

The formula (3) further controls the F number of the optical system by controlling the phase coefficient $a_1$ of the metalens, so as to realize the design of the larger aperture for the receiving lens of the optical system. And the formula (3) is beneficial to meet the design requirement of a larger aperture of the reviving lens for ToF.

Further, the metalens 13 of the optical system 1 satisfies:

$$-\frac{\pi}{a_1\lambda D} \le 1.1; \tag{5}$$

where $a_1$ is the phase coefficient of the metalens; λ is the wavelength of the incident light; D is the diameter of the entrance pupil of the optical system. In this way, the imaging quantity of the optical system 1 is further improved.

Further, the metalens 13 in the optical system specifically includes a substrate and nanostructures that setting on any side of the substrate. In one embodiment, the nanostructures are setting on the substrate that is towards the surface of the objection side. And the phase of the metalens 13 may also satisfy any of the following formulas from (6) to (13):

$$\varphi(r,\lambda)=\frac{2\pi}{\lambda}\sum_{i=1}^{N}a_i r^{2i}+\varphi_0(\lambda); \tag{6}$$

$$\varphi(r,\lambda)=\frac{2\pi}{\lambda}\sum_{i=1}^{N}\left(a_i r^{2i}+\frac{b_i}{r^{2i}}\right)+\varphi_0(\lambda); \tag{7}$$

$$\varphi(r,\lambda)=\frac{2\pi}{\lambda}\sum_{i=1}^{N}\frac{a_i}{r^{2i}}+\varphi_0(\lambda); \tag{8}$$

$$\varphi(r,\lambda)=\frac{2\pi}{\lambda}\sum_{i=1}^{N}a_i\left|r^i\right|+\varphi_0(\lambda); \tag{9}$$

$$\varphi(r,\lambda)=\frac{2\pi}{\lambda}\sum_{i=1}^{N}\left(a_i\left|r^i\right|+\frac{b_i}{\left|r^i\right|}\right)+\varphi_0(\lambda); \tag{10}$$

$$\varphi(x,y,\lambda)=\frac{2\pi}{\lambda}\sum_{j=1}^{N}\sum_{i=1}^{j}\left(a_{ij}x^i y^{j-i}+b_{ij}x^{j-i}y^i\right)+\varphi_0(\lambda); \tag{11}$$

$$\varphi(x,y,\lambda)=\frac{2\pi}{\lambda}\left(f-\sqrt{f^2+r^2}\right)+\varphi_0(\lambda); \tag{12}$$

$$\varphi(x,y,\lambda)=\frac{2\pi}{\lambda}\left(\sqrt{f^2+r^2}-f\right)+\varphi_0(\lambda); \tag{13}$$

wherein, r is the distance between the center of the metalens to the center of any nanostructure; λ is the wavelength of the incident light; $\varphi_0$ is the phase of any incident light; (x, y) is the coordinate of the metalens; f the focal length of the metalens. In this embodiment, comparing with formulas (6), (7), (11), (12) and (13), the formulas (9), (10) and (11) can satisfy not only the phase optimization of the even degree polynomial but also the phase optimization of the odd degree polynomial. Meanwhile, the formulas (9), (10) and (11) will not break the rotational symmetry of the phase of the metalens, which significantly improves the freedom of the optimization for the metalens. It should be noted that the $a_1$ is less than 0 in the formulas (5), (6), (7), (11) and (12) and $a_2$ is less than 0 in formulas (8), (9) and (10).

In some optional embodiments, D, the diameter of the entrance pupil of the optical system 1, is greater than or equal to 1.2 mm, and is less than or equal to 1.4 mm. In some optional embodiments, the effective focal length is greater than or equal to 1.3 mm and less than or equal to 1.4 mm. Optionally, the TTL of the optical system 1 is less than or equal to 3.1 mm.

Next, the lens barrel 2 of the embodiment in the present disclosure is described below. The lens barrel 2 may be an integral structure or a split structure, which is not limited in this disclosure. The inner wall of the lens barrel 2 provided in this disclosure is optionally provided with optical elements or optical structural elements, which will not be repeated in this disclosure.

Since the metalens 13 shows characteristics of athermalization, its optical performance will not change with the ambient temperature changes. However, the material of the lens barrel 2 is influenced by the ambient temperature and will have the phenomena of the cold shrinkage and thermal expansion corresponding to the ambient temperature changes. So the lens barrel 2 will change the position of the metalens 13 on the optical axis, resulting in the defocus of the optical system 1.

Preferably, the lens barrel 2 also satisfies:

$$a_H*L\le 124.1; \tag{14}$$

where $a_H$ is the thermal expansion coefficient of the material of the lens barrel; L is the length of the lens barrel. The formula (14) is capable of limiting the thermal expansion coefficient of the lens barrel 2, which can further compress the effect of the ambient temperature on the optical performance of the lens barrel 2 provided in this disclosure.

Preferably, the lens barrel 2 also satisfies:

$$a_H*L\le 70.8; \tag{15}$$

Where $a_H$ is the thermal expansion coefficient of the material of the lens barrel; L is the length of the lens barrel. Furthermore, the effect of the ambient temperature on the optical performance of the lens barrel 2 is reduced. It should be understood that the length of the lens barrel is the distance from the front end of the lens barrel 2 to the distal end of the lens barrel 2.

In some embodiments, a split structure of lens barrel 2 is provided by the present disclosure, including a first lens barrel 21, a second lens barrel 22 and a third lens barrel 23. And the first lens barrel 21 is in detachable socketing to the inside of the second lens barrel 22; the second lens barrel 22 is in detachable socketing to the inside of the third lens barrel 23. For example, the first lens barrel 21 and the second lens barrel 22 are connected by screw thread 23; and the second barrel 22 and the third barrel 23 are connected by screw thread.

In one embodiment, the outer wall of the first lens barrel 21 is provided with the outer screw thread. The inner wall of the second lens barrel 22 is provided with the inner screw thread and the outer wall of the second lens barrel 22 is provided with the outer screw thread. The inner wall of the third lens barrel 23 is provided with the inner screw thread and the outer wall of the third lens barrel 23 is provided with the outer screw thread.

As shown in FIG. 2, the shape of the first lens barrel 21 is cylinder, and the inner wall of the first lens barrel 21 has a first hole, and the first hole is tapered. The end of the larger inner diameter of the first hole is towards the object side, and the end of the smaller inner diameter of the first hole is towards the image side. A flange is setting on the outer wall of the first lens barrel 21, and the outer wall of the flange has an outer screw thread; the outer screw thread of the flange is used to connect to the inner screw thread of the second barrel 22. The shape of the second lens barrel 22 is cylinder. One end of the second lens barrel 22 is open, and the other end has a radial-shrinkage stair, and the center of radial-shrinkage stair has a second hole. The second hole is tapered, and the smaller inner diameter of the second hole is close to the open end of the second lens barrel 22, and the larger inner diameter of the second hole is away from the open end of the second lens barrel 22. The shape of the third lens barrel 23 is a cylinder. One end of the third lens barrel 23 is open, and the other end has a baseboard, and the center of the baseboard has a third hole.

The metalens 13 is covered on the first hole, the part of the substrate with nanostructures covers the first hole, and the extended part of the substrate without nanostructures is pressed on the baseboard. The optical filter 12 is covered on the smaller inner diameter of the second hole, and the first lens barrel 21 is socketing to the second lens barrel 22, so as to form a fixation by pressing the smaller inner diameter end of the first hole on the optical filter 12. The aperture slot 11 is set on the one end of the larger inner diameter of the first hole. Optionally, the optical filter and the metalens can be fixed by gluing.

It should be noted that the metalens provided by the embodiment of the present disclosure can be manufactured through a semiconductor process and has the advantages of light weight, thin thickness, simple structure and process, low cost and high consistency in mass production.

Embodiment 1

Figure 3:
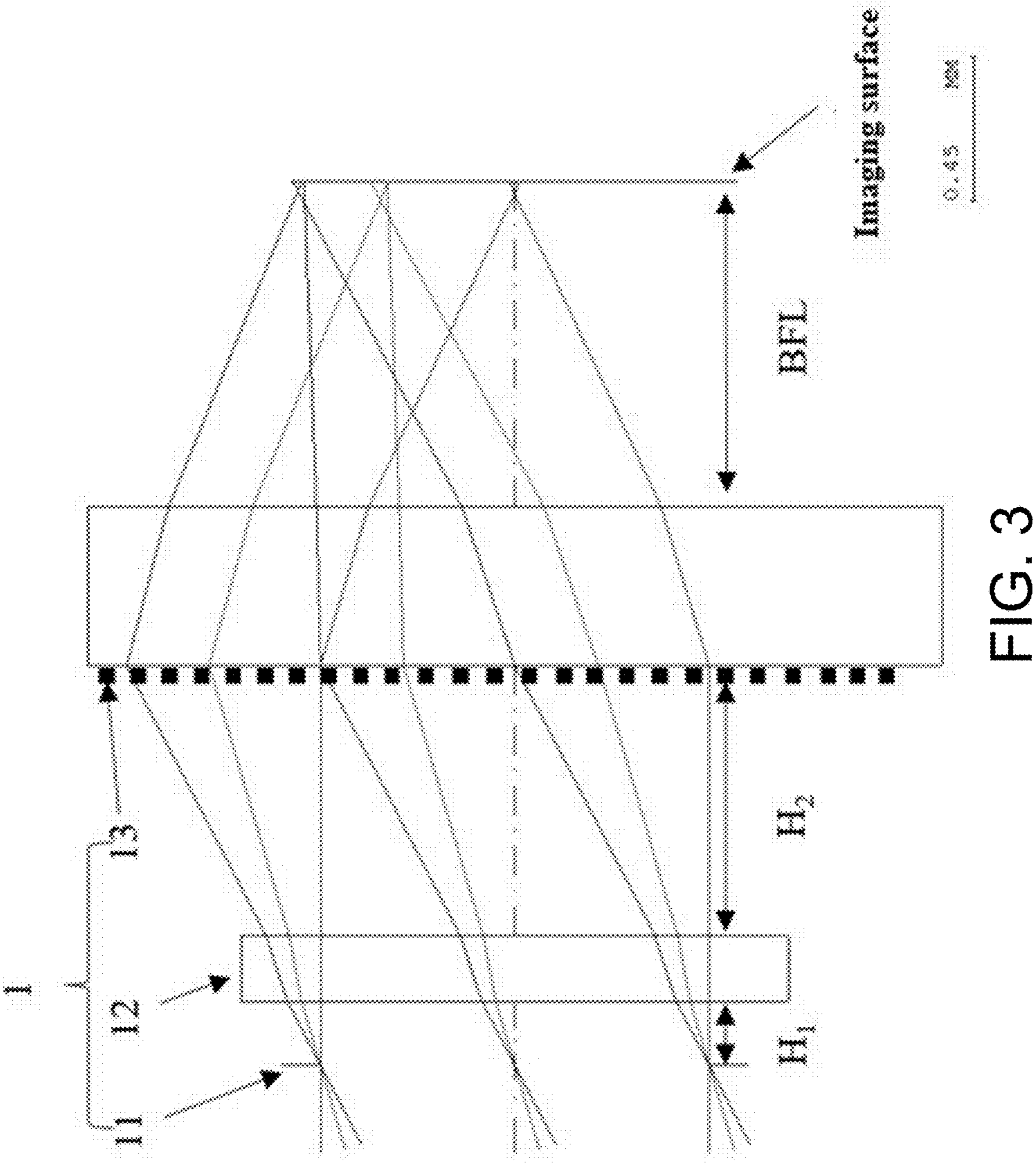
FIG. 3 shows an optional structural diagram of an optical system provided by the embodiment of the present disclosure.

As shown in FIG. 3, the embodiment 1 provides a lens for ToF. The system parameters of the optical system are shown in Table 1. And surface parameters of the optical system 1 are shown in Table 2.

TABLE 1

| System Parameter | Value |
|---|---|
| TTL | 2.97 mm |
| Field of View (2ω) | 55° |
| F number | 1.0 |
| Effective Focal Length | 1.33 mm |
| Working waveband | 850 nm |

TABLE 2

| Serial number of the surface | Type of the surface | Radius (mm) | Thickness (mm) | Material |
|---|---|---|---|---|
| 1 | Aperture slot | Infinity | 0.28 | — |
| 2 | Sphere | Infinity | 0.21 | 1.51, 64.20 |
| 3 | Sphere | Infinity | 1.00 | — |
| 4 | Metalens | Infinity | 0.50 | 1.46, 67.8 |
| 5 | Sphere | Infinity | 1.00 | — |
| 6 | Imaging Surface | Infinity | — | — |

Figure 4:
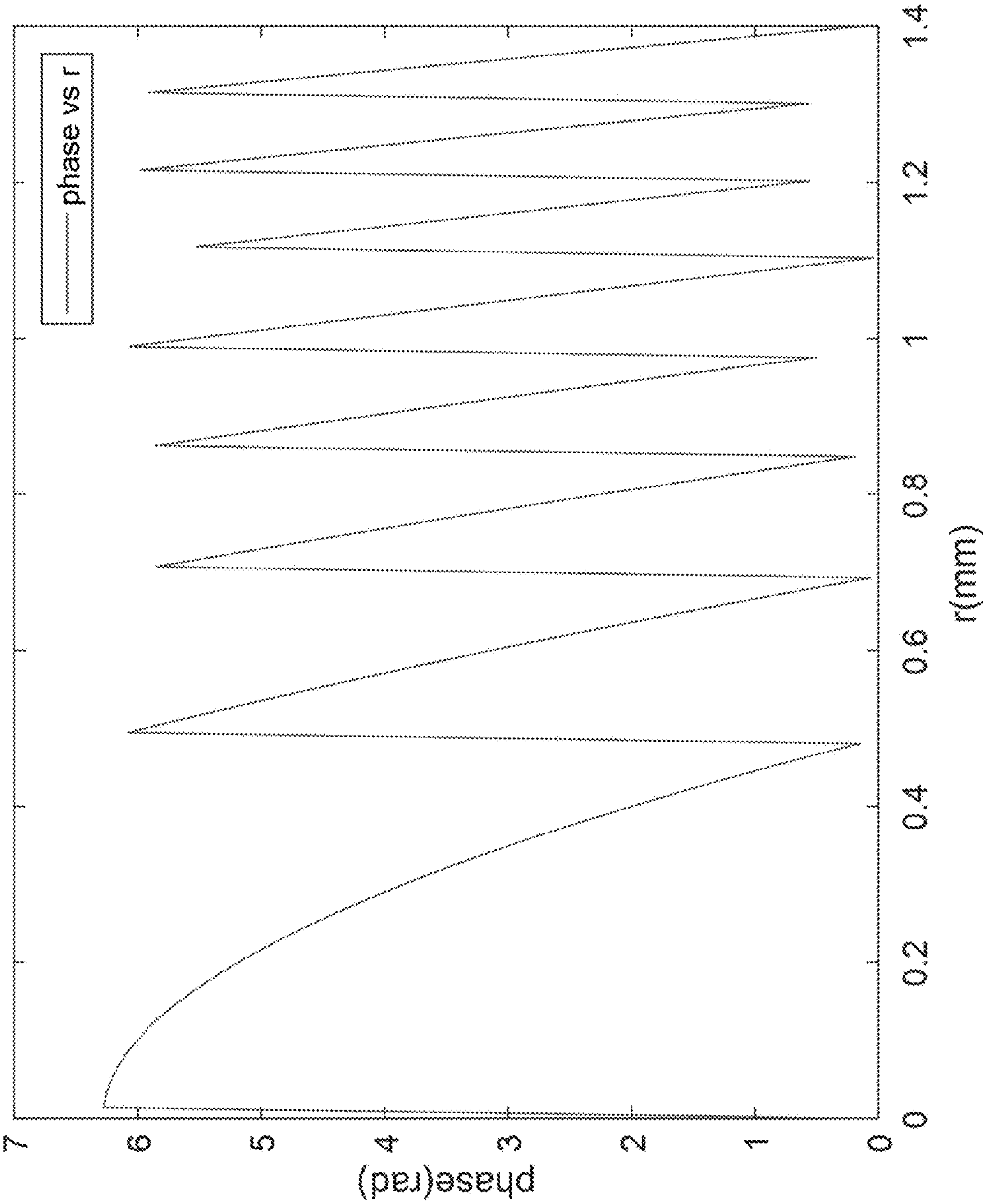
FIG. 4 shows an optional phase distribution diagram provided by the embodiment of the present disclosure.
Figure 5:
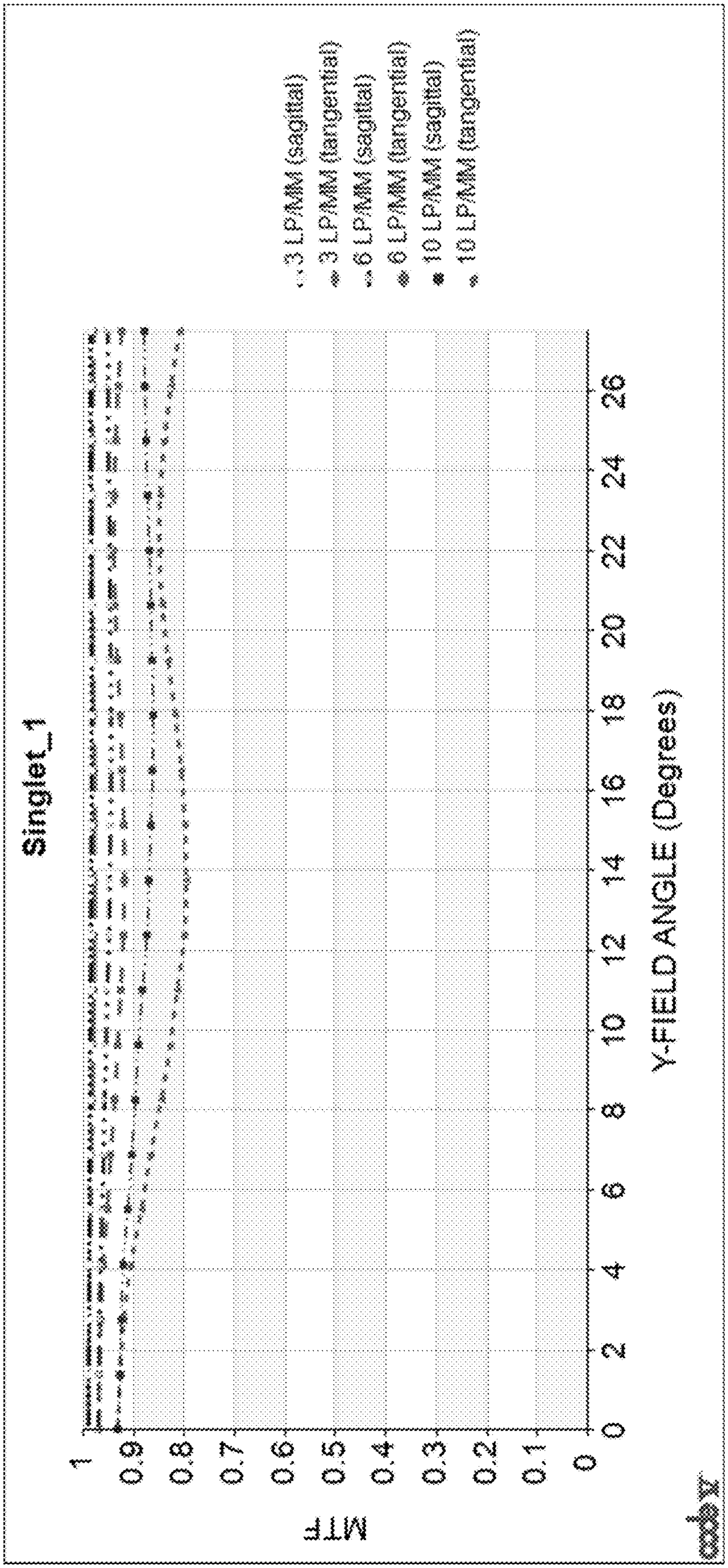
FIG. 5 shows an optional MTF line graph provided by the embodiment of the present disclosure.
Figure 6:
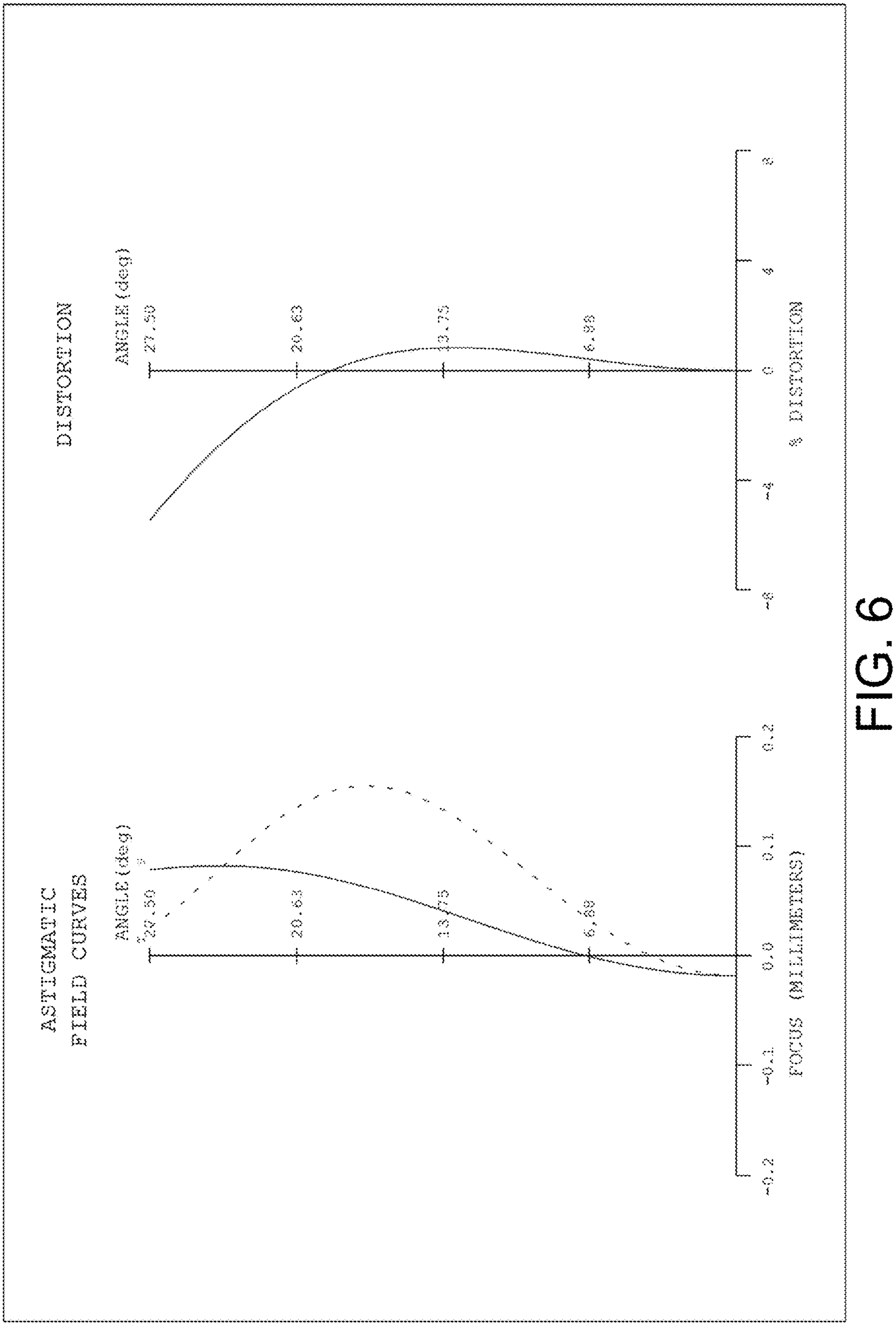
FIG. 6 shows a schematic view of an optional field curvature and the distortion curve of the optical system according to an embodiment of the present disclosure.
Figure 7:
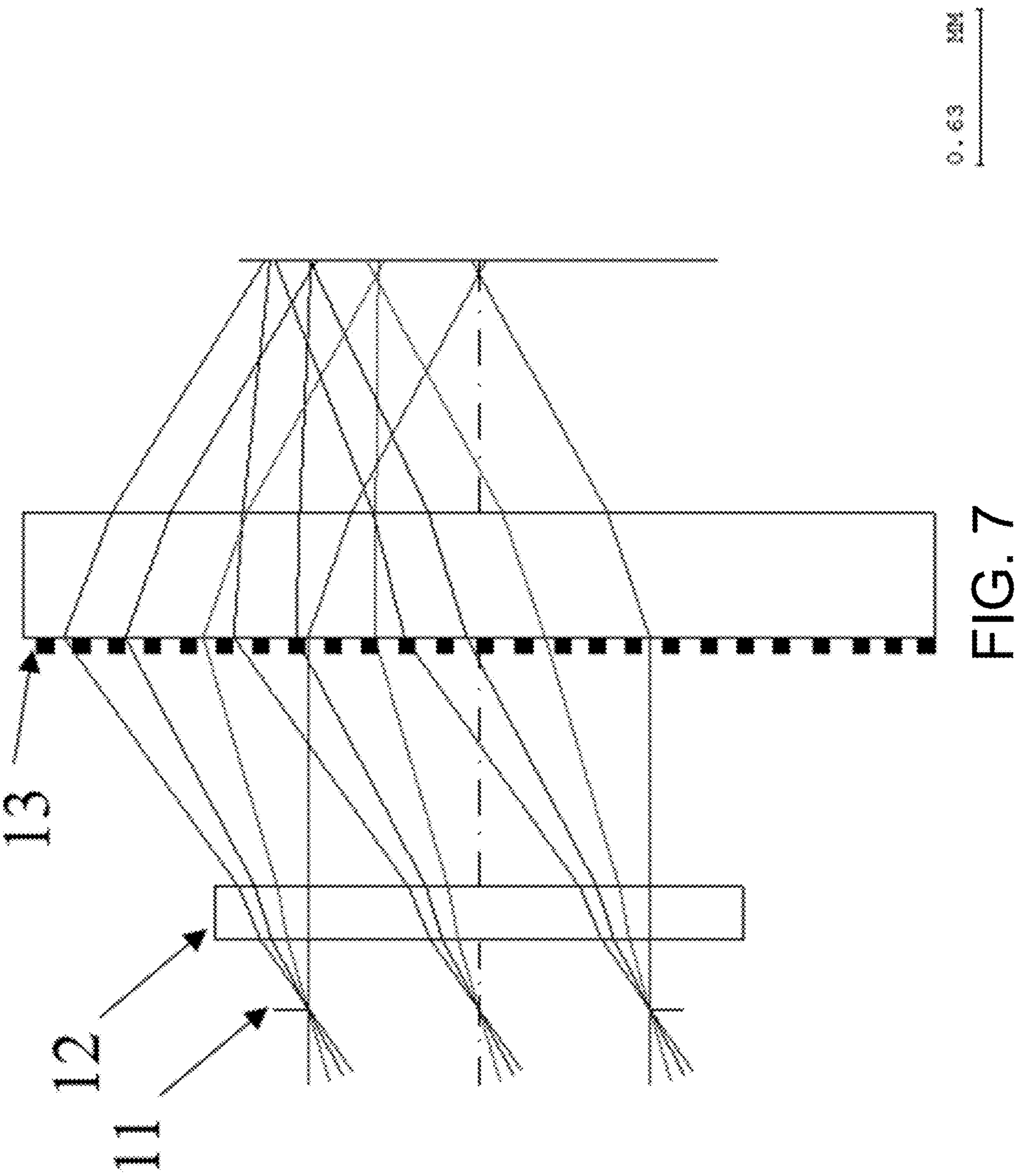
FIG. 7 shows a schematic view of an optional field curvature and the distortion curve of the optical system according to an embodiment of the present disclosure.
Figure 8:
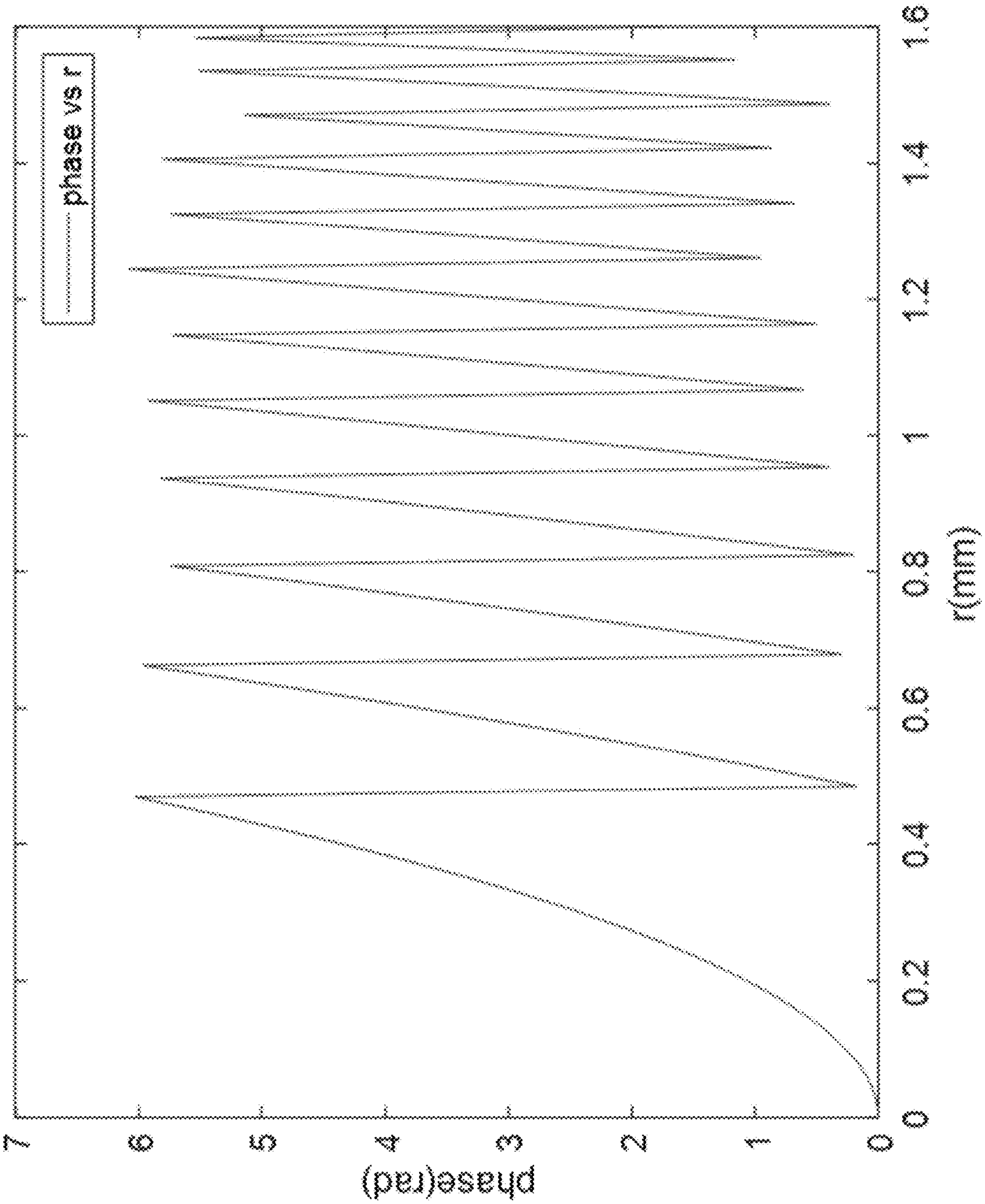
FIG. 8 shows an optional phase distribution diagram provided by the embodiment of the present disclosure.
Figure 9:
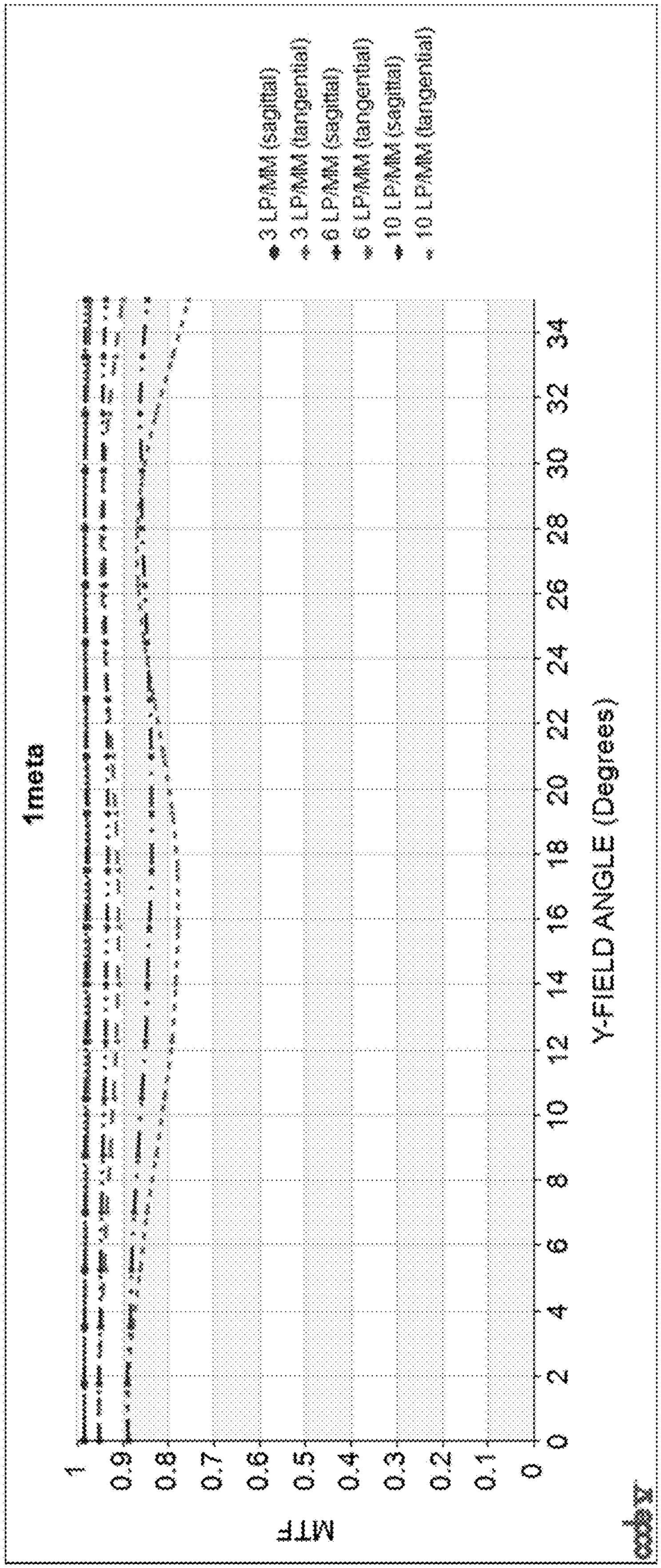
FIG. 9 shows an optional MTF line graph provided by the embodiment of the present disclosure.
Figure 10:
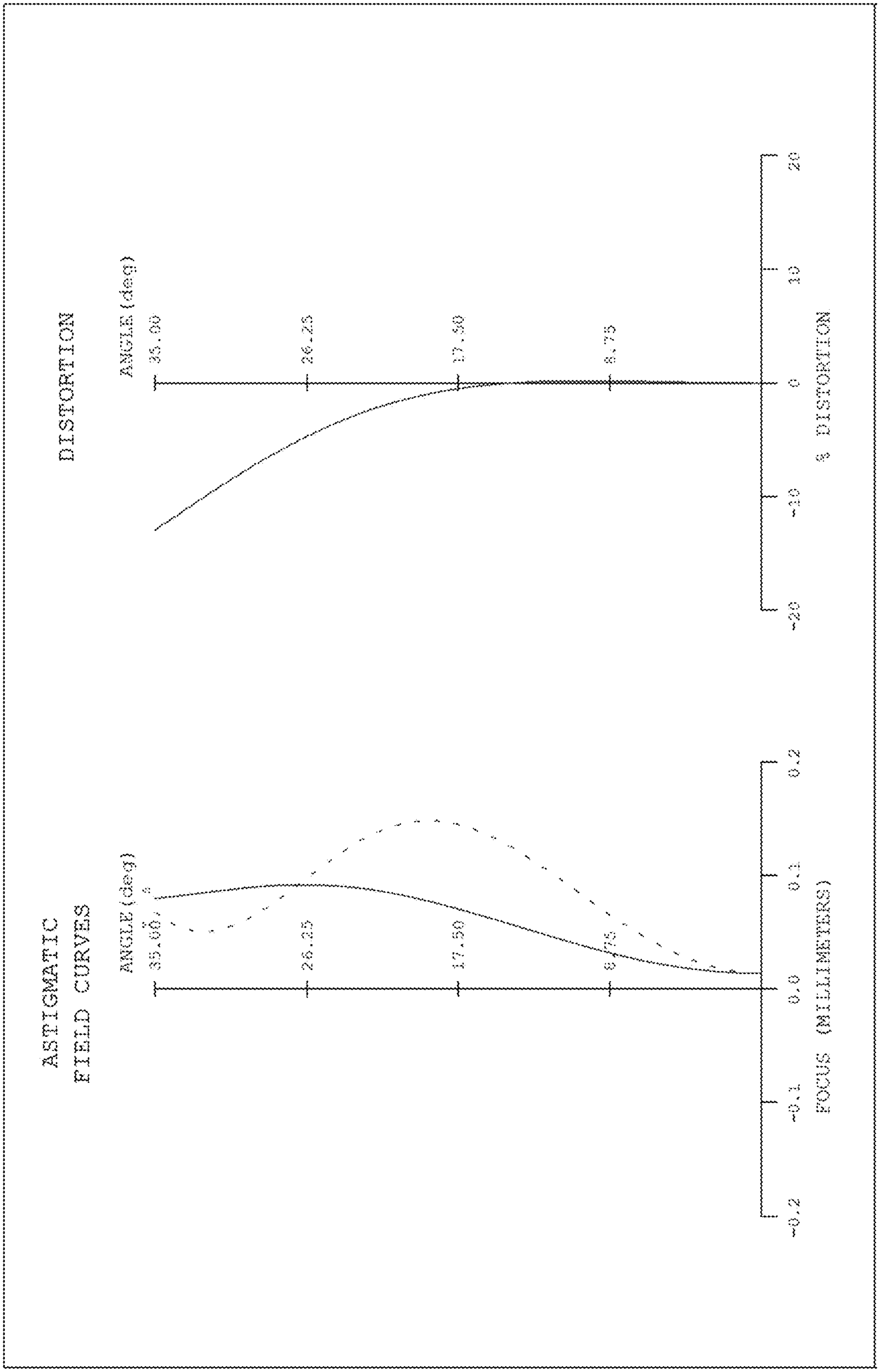
FIG. 10 shows a schematic view of an optional field curvature and the distortion curve of the optical system according to an embodiment of the present disclosure.

FIG. 4 shows the phase distribution of the metalens in the optical system, and the phase distribution covers 2π. FIG. 5 shows the MTF (Modulation Transfer Function) of the optical system. In FIG. 5, different types of the lines illustrate the MTF of different line pairs in the optical system. As shown in FIG. 5, the minimum value of the MTF is 0.8, which indicates that the MTF lines of the optical system in different Field of View are close to the diffraction limit and have good resolving power. FIG. 10 shows the field curvature and the distortion curve of the optical system. As shown in FIG. 10, the field curvature and the distortion curve of the optical system have been controlled well.

Embodiment 3

Figure 11:
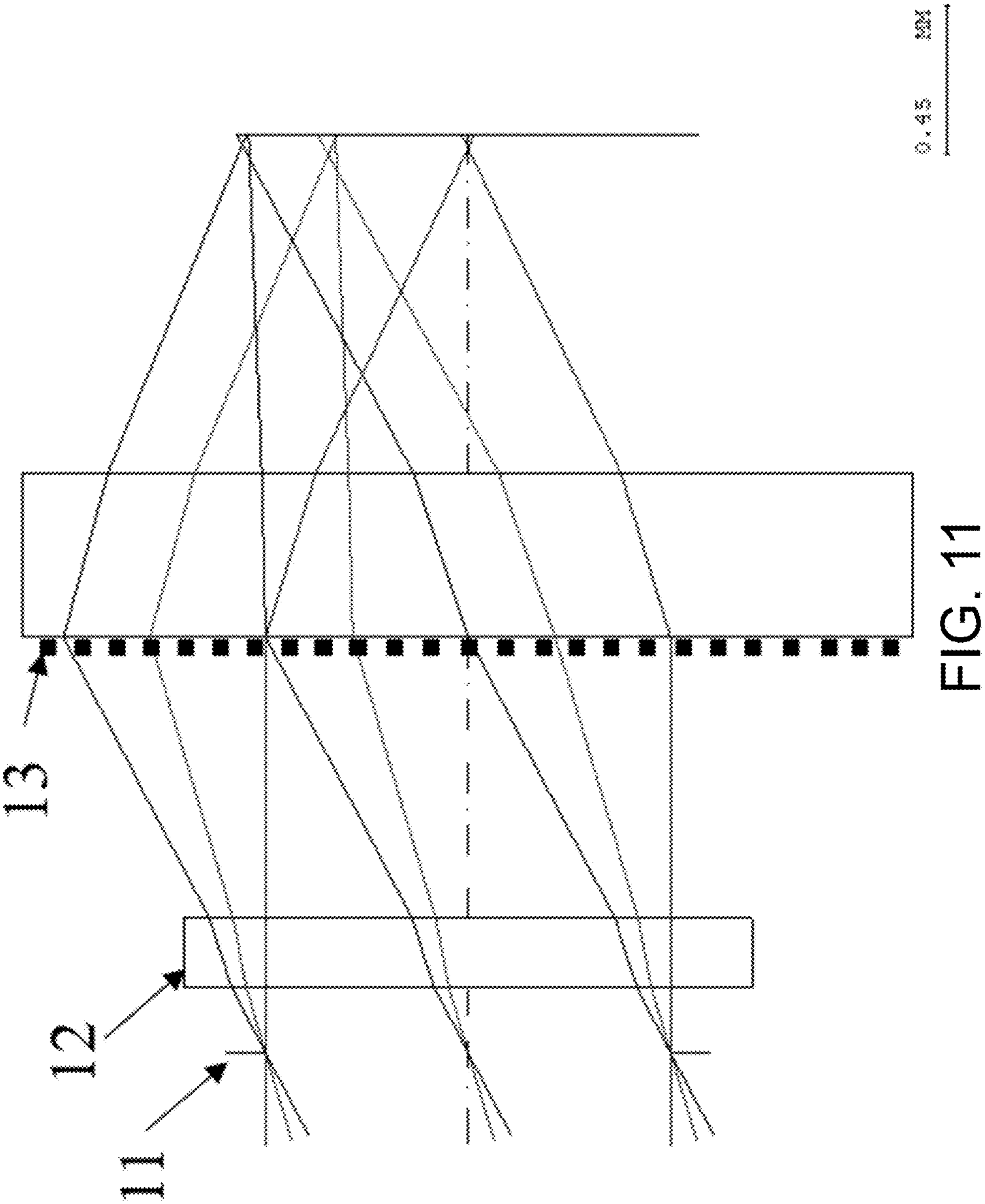
FIG. 11 shows an optional structural diagram of an optical system provided by the embodiment of the present disclosure.

As shown in FIG. 11, the embodiment 3 provides another lens for ToF. The system parameters of the optical system 1 of the lens are shown in Table 5. And the surface parameters of the optical system 1 are shown as Table 6.

TABLE 5

| System Parameter | Value |
|---|---|
| TTL | 2.80 mm |
| Field of View (2ω) | 55° |
| F number | 1.1 |
| Effective Focal Length | 1.36 mm |
| Working waveband | 850 nm |

TABLE 6

| Serial number of the surface | Type of the surface | Radius (mm) | Thickness (mm) | Material |
|---|---|---|---|---|
| 1 | Aperture slot | Infinity | 0.20 | — |
| 2 | Sphere | Infinity | 0.21 | 1.51, 64.20 |
| 3 | Sphere | Infinity | 0.86 | — |
| 4 | Metalens | Infinity | 0.50 | 1.46, 67.8 |
| 5 | Sphere | Infinity | 1.03 | — |
| 6 | Imaging Surface | Infinity | — | — |

Figure 12:
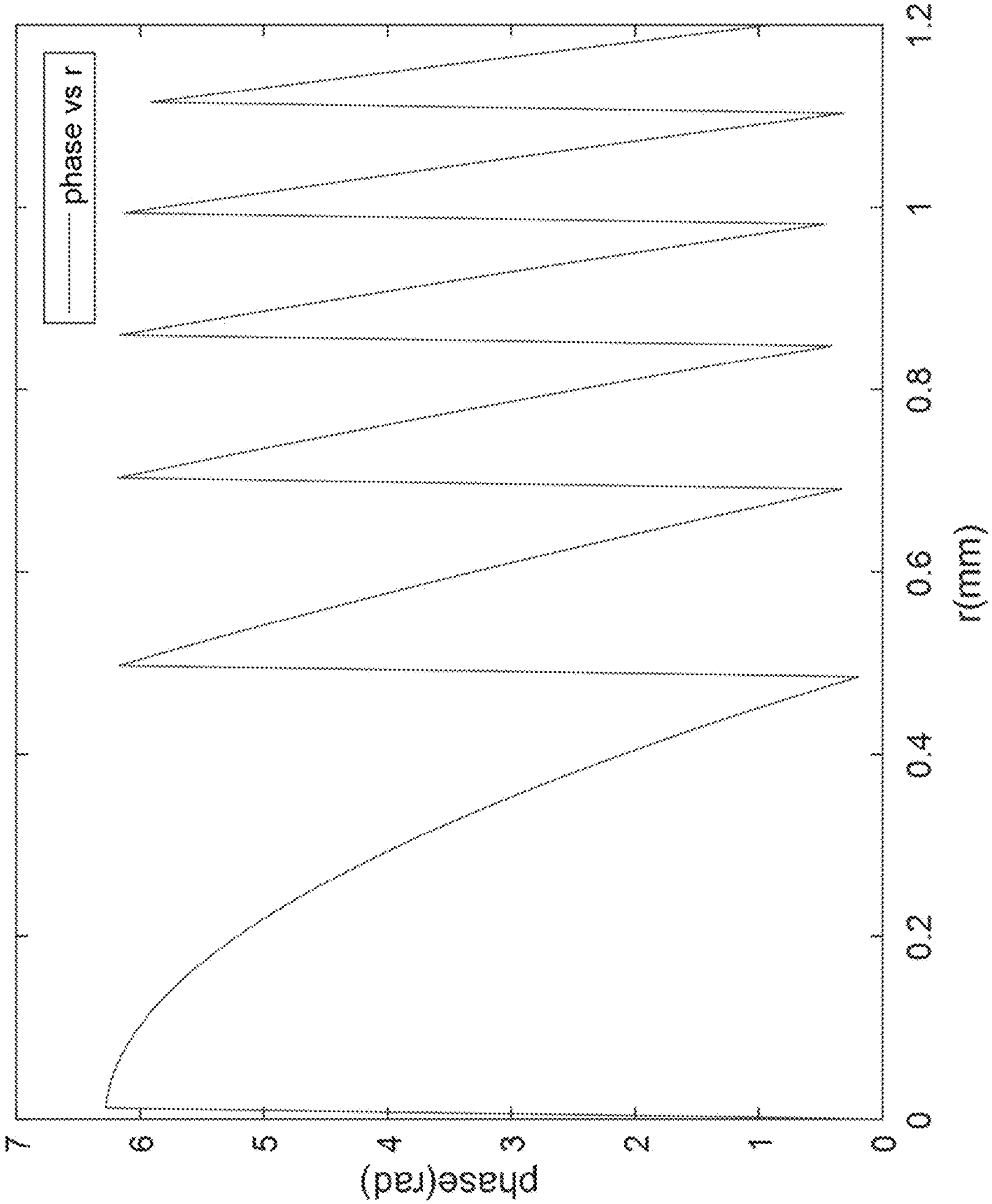
FIG. 12 shows an optional phase distribution diagram provided by the embodiment of the present disclosure.
Figure 13:
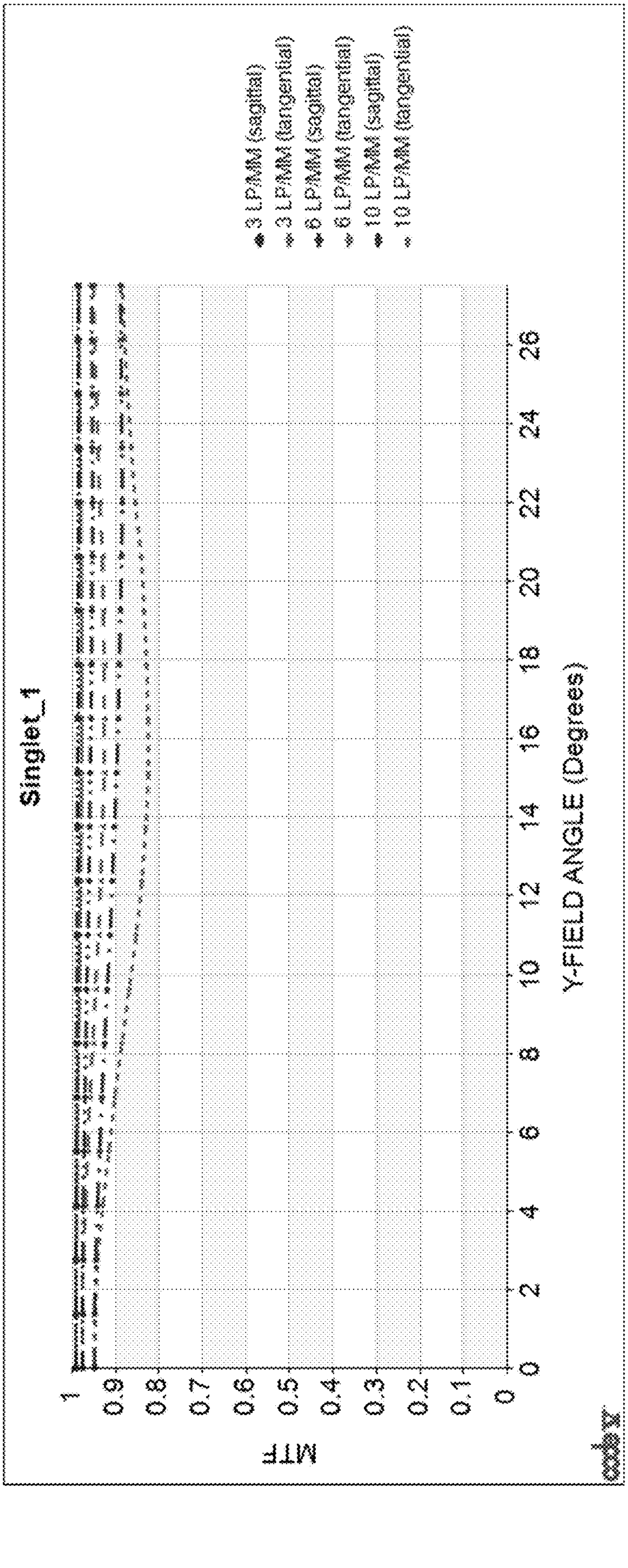
FIG. 13 shows an optional MTF line graph provided by the embodiment of the present disclosure.
Figure 14:
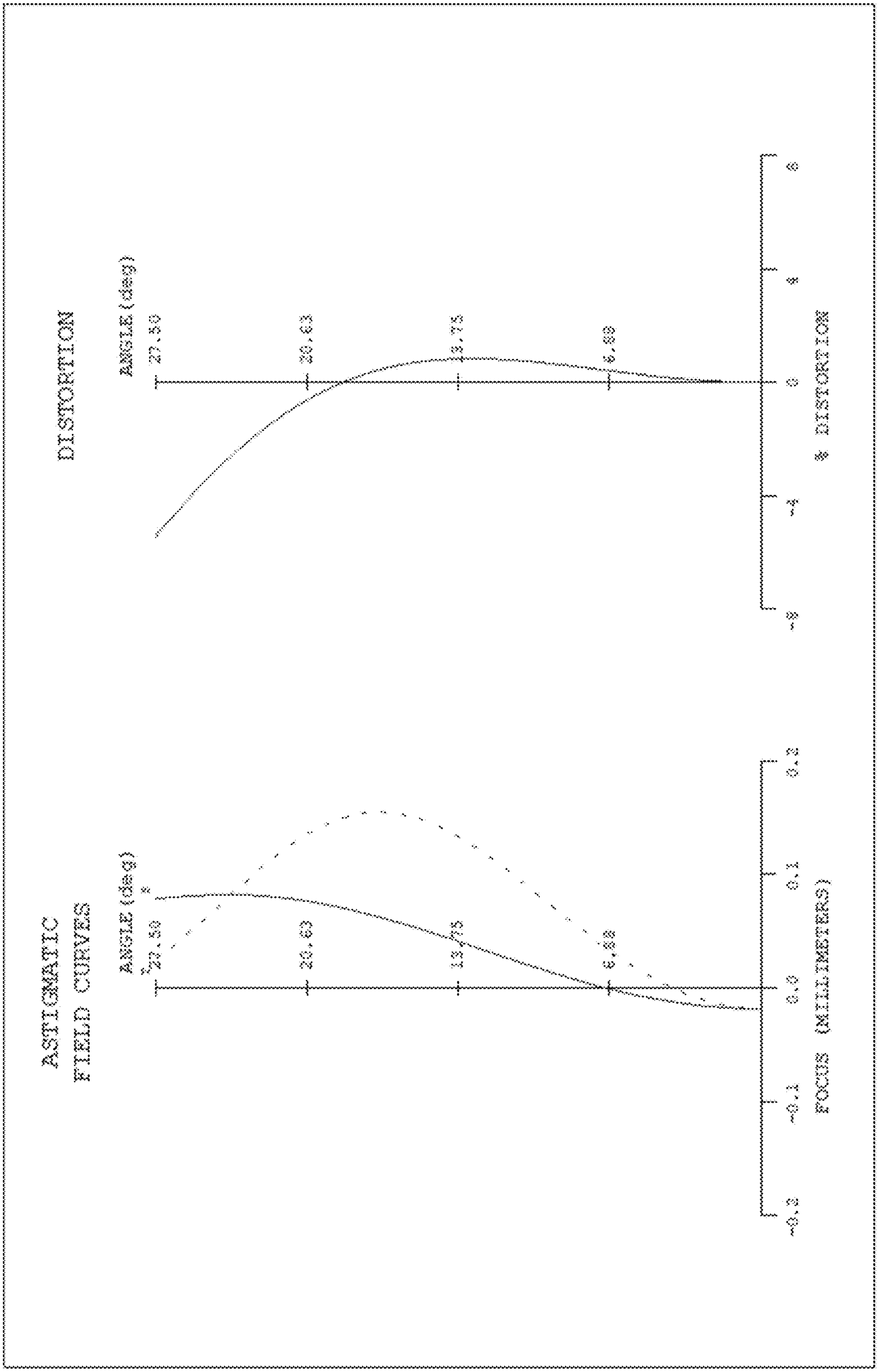
FIG. 14 shows a schematic view of an optional field curvature and the distortion curve of the optical system according to an embodiment of the present disclosure.

FIG. 12 shows the phase distribution of the metalens in the optical system, and the phase distribution covers 2π. FIG. 13 shows the MTF (Modulation Transfer Function) of the optical system. In FIG. 13, different types of the lines illustrate the MTF of different line pairs in the optical system. As shown in FIG. 13, the minimum of the MTF is 0.82, which indicates that the MTF lines of the optical system in different Field of View are close to the diffraction limit and have good resolving power. FIG. 14 shows the field curvature and the distortion curve of the optical system. As shown in FIG. 14, the field curvature and the distortion curve of the optical system have been controlled well.

Embodiment 4

Figure 15:
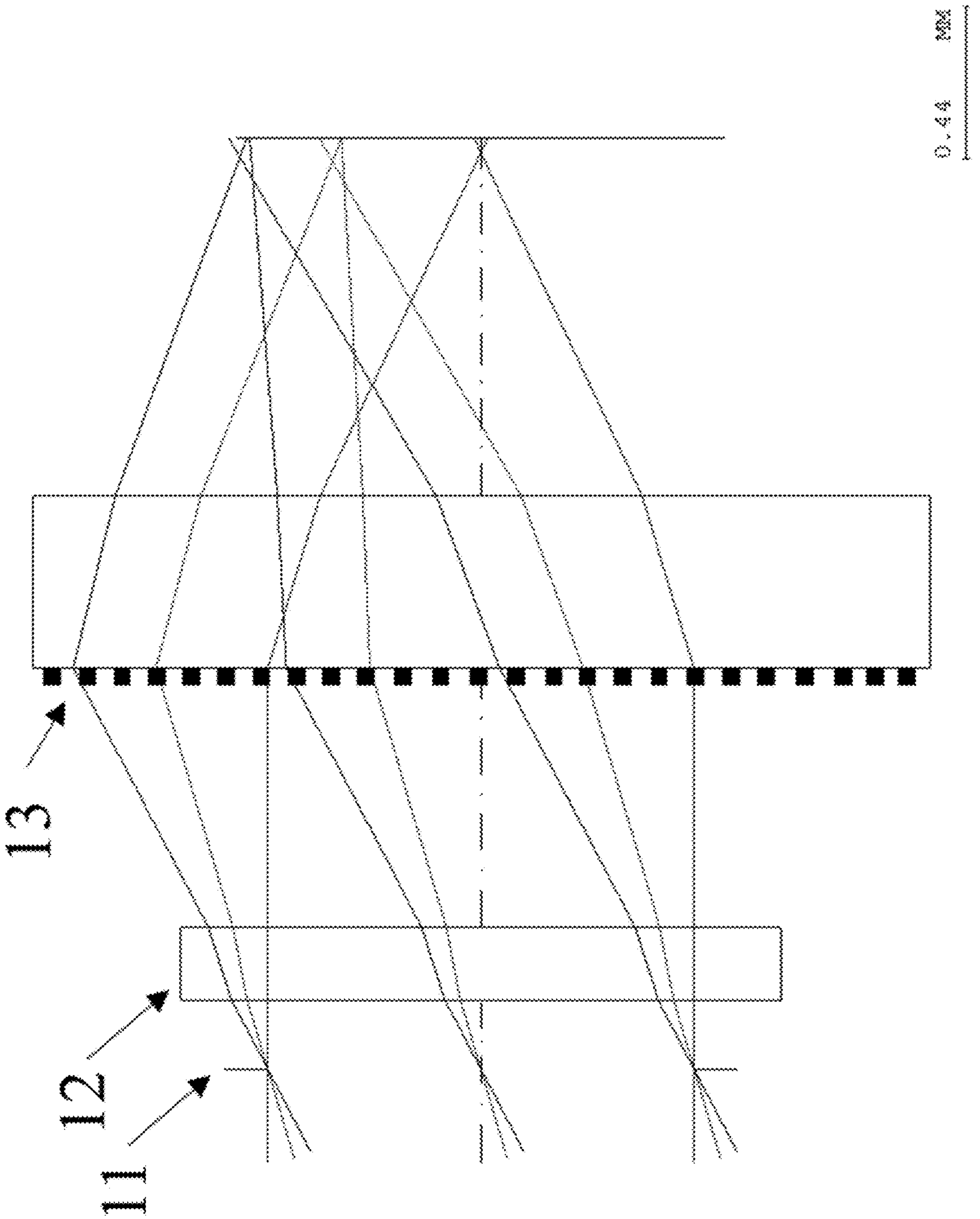
FIG. 15 shows an optional structural diagram of an optical system provided by the embodiment of the present disclosure.

As shown in FIG. 15, the embodiment 4 provides another lens for ToF. The system parameters of the optical system 1 of the lens are shown in Table 7. And the surface parameters of the optical system 1 are shown as Table 8.

TABLE 5

| System Parameter | Value |
|---|---|
| TTL | 2.70 mm |
| Field of View (2ω) | 55° |
| F number | 1.1 |
| Effective Focal Length | 1.36 mm |
| Working waveband | 850 nm |

TABLE 6

| Serial number of the surface | Type of the surface | Radius (mm) | Thickness (mm) | Material |
|---|---|---|---|---|
| 1 | Aperture slot | Infinity | 0.20 | — |
| 2 | Sphere | Infinity | 0.21 | 1.51, 64.20 |
| 3 | Sphere | Infinity | 0.75 | — |
| 4 | Metalens | Infinity | 0.50 | 1.46, 67.8 |
| 5 | Sphere | Infinity | 1.03 | — |
| 6 | Imaging Surface | Infinity | — | — |

Figure 16:
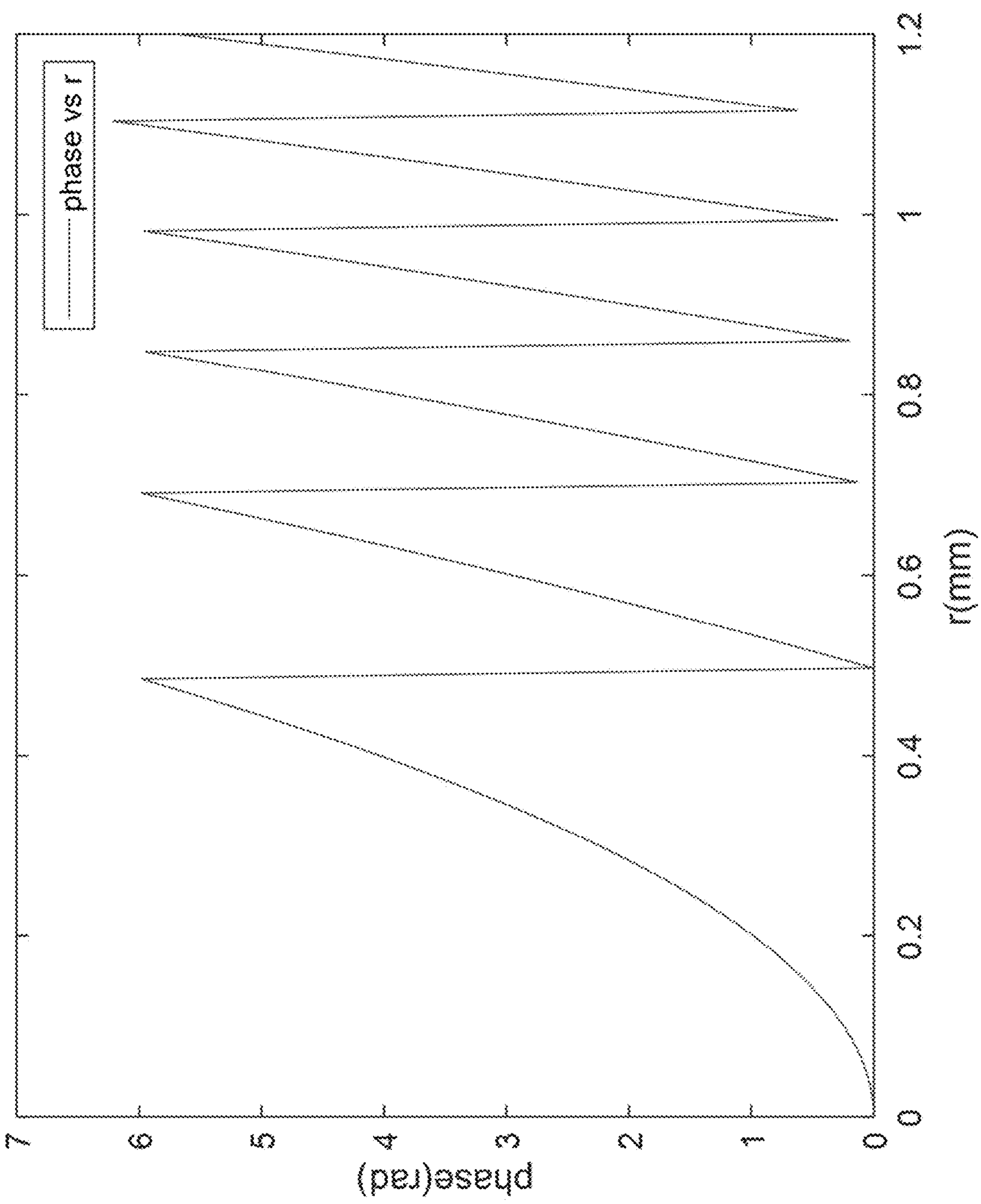
FIG. 16 shows an optional phase distribution diagram provided by the embodiment of the present disclosure.
Figure 17:
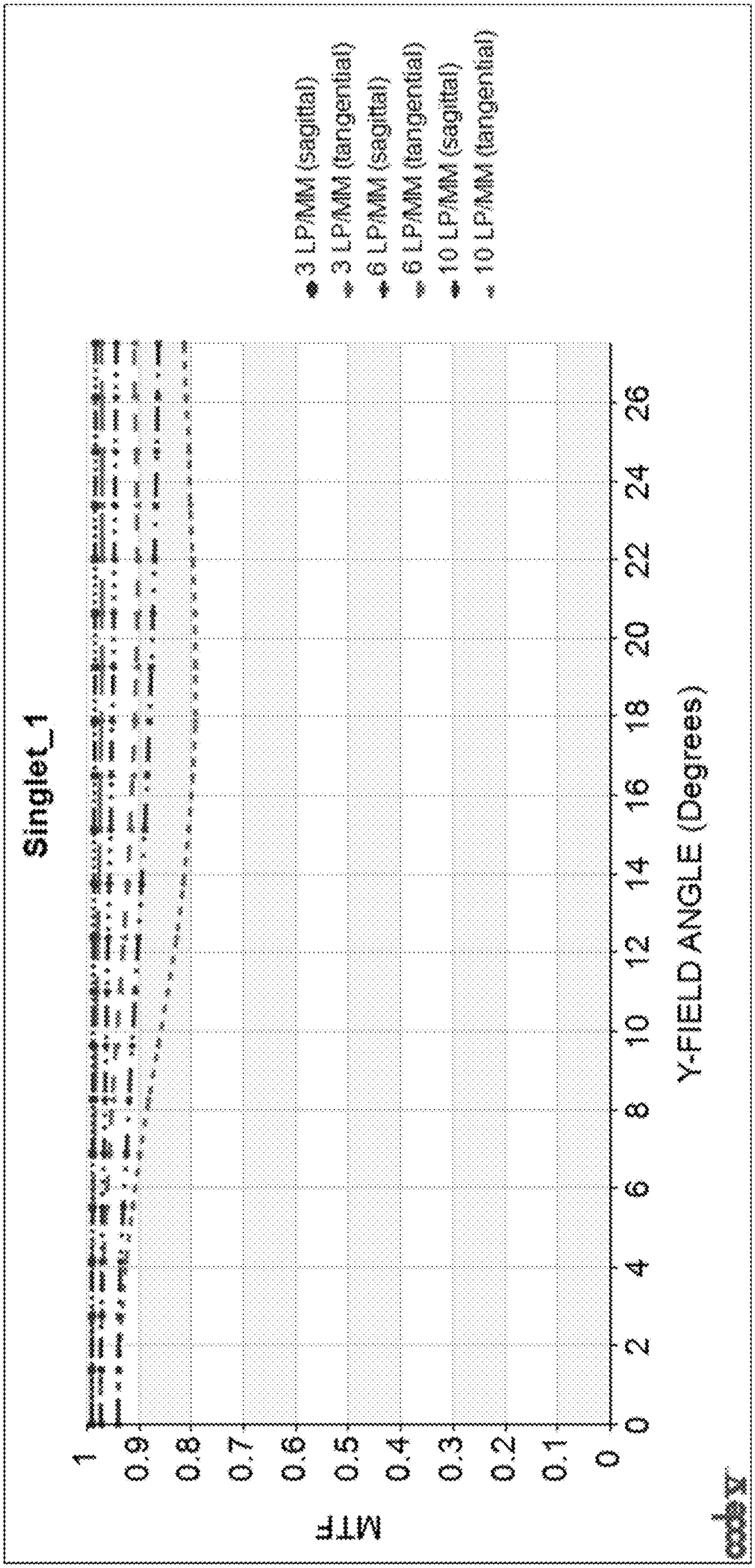
FIG. 17 shows an optional MTF line graph provided by the embodiment of the present disclosure.
Figure 18:
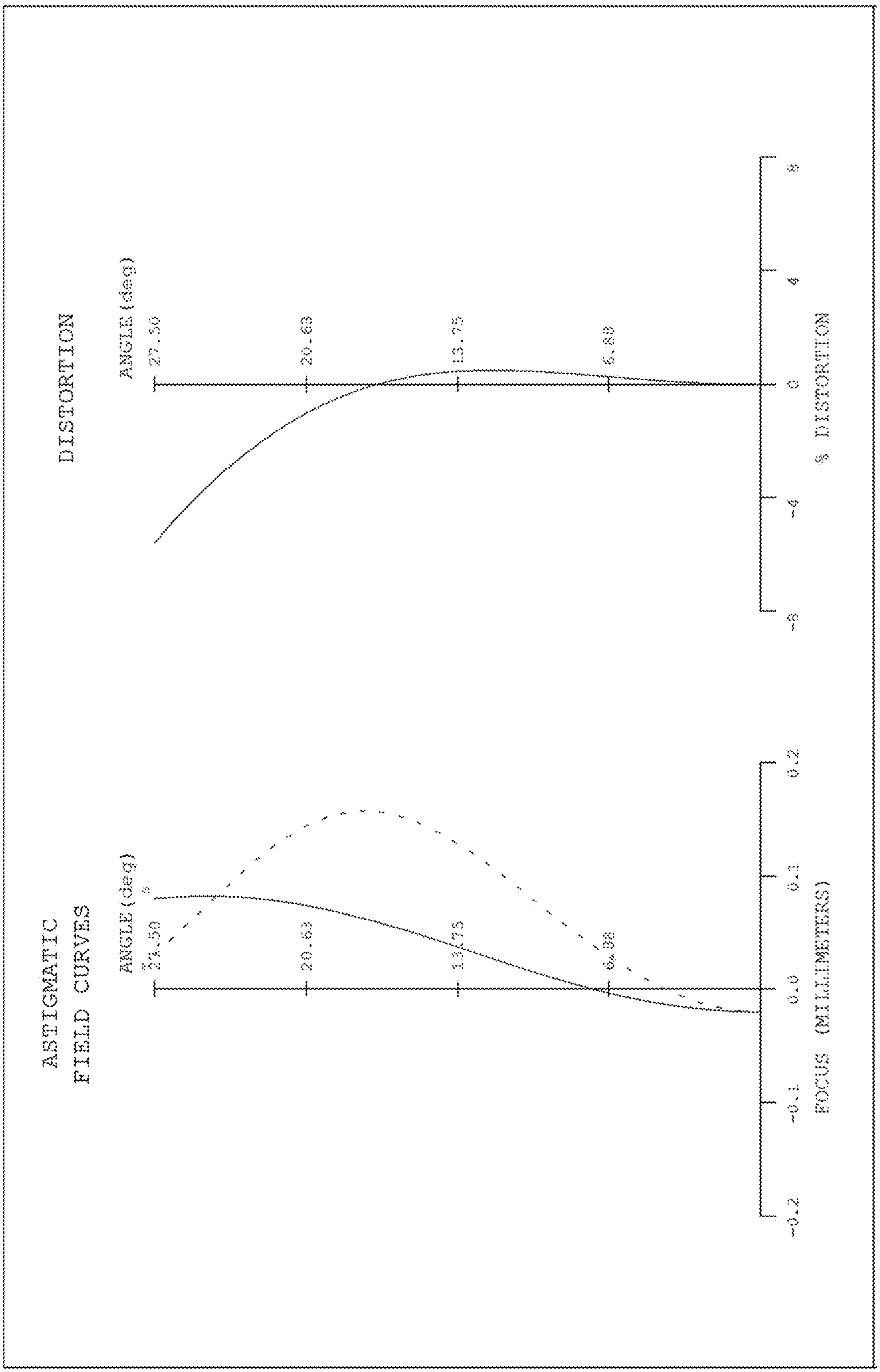
FIG. 18 shows a schematic view of optional field curvature and the distortion curve of the optical system provided by the embodiment of the present disclosure.

FIG. 16 shows the phase distribution of the metalens in the optical system, and the phase distribution covers 2π. FIG. 17 shows the MTF (Modulation Transfer Function) of the optical system. In FIG. 17, different types of the lines illustrate the MTF of different line pair in the optical system. As shown in FIG. 17, the minimum value of the MTF is 0.79, which indicates that the MTF lines of the optical system in different Field of View are close to the diffraction limit and have good resolving power. FIG. 18 shows the field curvature and the distortion curve of the optical system. As shown in FIG. 18, the field curvature and the distortion curve of the optical system 1 have been controlled well.

The parameter summary of the lens for ToF provided by embodiments 1 to 4 is shown in Table 9.

TABLE 9

| Conditional | Embodiment 1 | Embodiment 2 | Embodiment 3 | Embodiment 4 |
|---|---|---|---|---|
| 2.00 mm ≤ $H_1$ + $H_2$ + BF ≤ 4.3 mm | 2.28 | 2.31 | 2.09 | 1.98 |
| $a_1$ | −2780 | −2699.54 | −2717.90 | −2717.26 |
| D(mm) | 1.33 | 1.37 | 1.24 | 1.24 |
| $-\frac{\pi}{a_1\lambda D} \le 1.5$ | 1.0 | 1.0 | 1.1 | 1.1 |
| $a_H$ * L ≤ 124.1 | 53.8 | 69.3 | 49.7 | 46.7 |

In conclusion, the lens for ToF provided by the embodiments by the present disclosure uses one metalens to obtain a small volume lens for ToF with a stable optical performance. In addition, the present disclosure controls the phase coefficients to the satisfy the requirements for a larger aperture.

The above is only a specific embodiment of the embodiments of this disclosure, but the scope of protection of the embodiment of this disclosure is not limited to this. And those skilled in the field can easily think of any change or substitution for this disclosure, which should be covered within the protection scope of this disclosure. Therefore, the scope of the protection of the present disclosure shall be the scope of the claims.

What is claimed is:

1. A lens for ToF, wherein the lens comprises: an optical system and a lens barrel; the optical system is confined within the lens barrel;

wherein, the optical system comprises: an aperture slot, an optical filter, and a metalens; the aperture slot, the optical filter and the metalens are disposed sequentially from an object side to an image side;

the total track length of the optical system is less than or equal to 3.1 mm.

2. The lens according to claim 1, wherein the optical system satisfies:

$$2.00\text{ mm} \le H_1 + H_2 + BFL \le 4.30\text{ mm};$$

wherein, the $H_1$ is a distance between the aperture slot and the optical filter; $H_2$ is a distance between the metalens and the optical filter; BFL is a back focal length of the optical system.

3. The lens according to claim 2, wherein the optical system satisfies:

$$1.98\text{ mm} \le H_1 + H_2 + BFL \le 2.31\text{ mm}.$$

4. The lens according to claim 1, wherein the metalens satisfies:

$$-\frac{\pi}{a_1\lambda D} \le 1.5;$$

$$\varphi = -\frac{a_1\lambda}{\pi};$$

wherein, $a_1$ is a phase coefficient of the metalens; λ is a wavelength of an incident light; D is a diameter of an entrance pupil of the optical system; φ is a phase of the metalens.

5. The lens according to claim 4, wherein the metalens satisfies:

$$-\frac{\pi}{a_1\lambda D} \le 1.1$$

6. The lens according to claim 1, wherein the lens barrel satisfies:

$$a_H * L \le 124.1;$$

wherein, $a_H$ is a thermal expansion coefficient of a material of the lens barrel; L is a length of the lens barrel.

7. The lens according to claim 6, wherein the lens barrel satisfies:

$$a_H * L \le 70.8.$$

8. The lens according to claim 1, wherein the lens barrel comprises: a first lens barrel, a second lens barrel and a third lens barrel;

wherein, the first lens barrel is in detachable socketing to an inside of the second lens barrel; the second lens barrel is in detachable socketing to an inside of the third lens barrel.

9. The lens according to claim 8, wherein an inner wall of the first lens barrel has a first hole, and the first hole is tapered;

an end of a larger inner diameter of the first hole is towards the object side, and an end of a smaller inner diameter of the first hole is towards the image side.

10. The lens according to claim 9, wherein one end of the second lens barrel is open, and an other end has a radial-shrinkage stair;

a center of the radial-shrinkage stair has a second hole.

11. The lens according to claim 10, wherein the second hole is tapered;

a smaller inner diameter of the second hole is close to an open end of the second lens barrel, and a larger inner diameter of the second hole is away from the open end of the second lens barrel.

12. The lens according to claim 8, wherein one end of the third lens barrel is open, and an other end has a baseboard, and a center of the baseboard has a third hole.

13. The lens according to claim 12, wherein the metalens is covered on the first hole, a part of a substrate of the metalens with nanostructures covers the first hole, and an extended part of the substrate without nanostructures is pressed on the baseboard.

14. The lens according to claim 10, the optical filter is covered on a smaller inner diameter of the second hole, and the first lens barrel is socketing to the second lens barrel, so as to form a fixation by pressing a smaller inner diameter end of the first hole on the optical filter.

15. The lens according to claim 9, wherein the aperture slot is set on the end of the larger inner diameter of the first hole.

16. The lens according to claim 14, wherein the optical filter and the metalens can be fixed by gluing.

17. The lens according to claim 8, wherein the first lens barrel and the second lens barrel are connected by screw thread;

and the second barrel lens and the third barrel lens are connected by screw thread.

18. The lens according to claim 17, wherein a flange is setting on an outer wall of the first lens barrel, and an outer wall of the flange has an outer screw thread;

the outer screw thread of the flange is used to connect to an inner screw thread of the second barrel.

19. The lens according to claim 1, wherein an entrance pupil of the optical system is greater than or equal to 1.2 mm and is less than or equal to 1.4 mm; and an effective focal length of the optical system is greater to or equal to 1.3 mm and less than or equal to 1.4 mm.

20. The lens according to claim 1, wherein an entrance pupil of the optical system is greater to or equal to 1.2 mm and is less than or equal to 1.4 mm; or an effective focal length of the optical system is greater than or equal to 1.3 mm and less than or equal to 1.4 mm.

* * * * *